G. E. COLOMBEL.
COMPASS WITH ANGULAR SHIFTING MAGNIFYING DEVICE.
APPLICATION FILED JUNE 29, 1912.
1,107,901.   Patented Aug. 18, 1914.
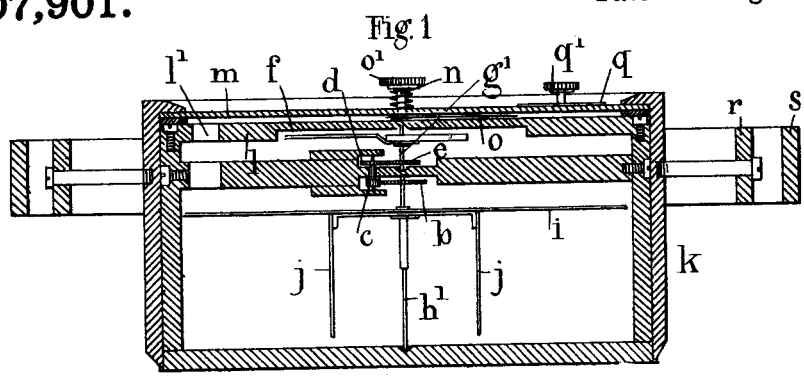
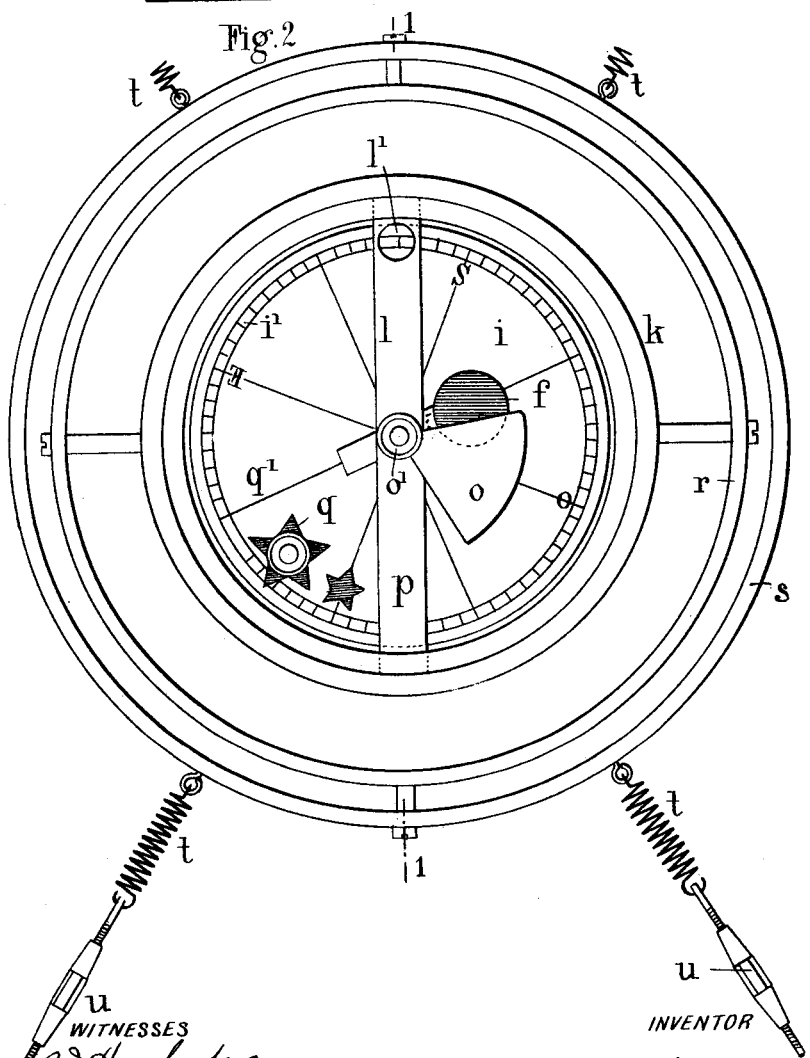
WITNESSES
INVENTOR
Gaston Emile Colombel
BY
ATTORNEYS

UNITED STATES PATENT OFFICE.

GASTON EMILE COLOMBEL, OF PARIS, FRANCE.

COMPASS WITH ANGULAR-SHIFTING MAGNIFYING DEVICE.

1,107,901.   Specification of Letters Patent.   Patented Aug. 18, 1914.

Application filed June 29, 1912. Serial No. 706,579.

*To all whom it may concern:*

Be it known that I, GASTON EMILE COLOMBEL, a citizen of the Republic of France, and a resident of 50 Rue de Moscou, Paris, France, have invented new and useful Compasses with Angular-Shifting Magnifying Devices, of which the following is a specification.

Mariners' and other compasses in which the angular variations have to be read directly on a scale on the compass rose are difficult to read accurately. It is necessary for the observer to come quite close to the apparatus in order to take the reading and it is not always easy to fulfil this condition particularly in aeroplanes. To obviate this defect it has been proposed to use the displacements of the needle or of the rose for moving, by means of an amplifying device, an indicator movable on the same dial as the one on which the needle or the rose moves.

The present invention relates to devices of this kind and has for its object certain improvements which permit to exactly mark the position of the indicator corresponding to a given direction and to appreciate with great facility the displacement of the indicator relatively to this position.

An embodiment of the invention is illustrated by way of example in the accompanying drawing, in which:

Figure 1 is a section on the line 1—1 in Fig. 2; and Fig. 2 is a plan view of a compass embodying the invention.

This device is more particularly intended for aviation.

The compass rose $i$ mounted on the spindle $h^1$ carries two parallel magnets $j$ as in the usual compasses. The indicator $f$ is mounted on the spindle $q^1$ and receives its movement from the spindle $h^1$ by the intermediary of the train of gear wheels $b$ $c$ $d$ $e$ the transmission ratio of which is assumed to be 4; consequently the indicator $f$ makes four revolutions when the magnetized device and the rose $i$ make one revolution.

The box $k$ of the compass carries a bar $l$ in which a circular sight aperture $l^1$ is formed, its axis constituting the axis line of the compass; the glass $m$ of the box carries a spindle $n$ coinciding with the spindles $q^1$ and $h^1$ and upon which a sector $o$ forming a screen is pivoted; this sector can be operated by means of a knob $o^1$. The dimensions of the sector $o$ are such that it is able exactly to cover the indicator $f$.

The rose $i$ upon which the north-south and east-west lines are drawn together with their bisecting lines, is provided with a scale $i^1$. The north-south line of the rose is differentiated by a special coloring, and carries at its north extremity a star $p$ which is also of a distinguishing color. No numeral or letter need be marked upon the rose because, as will hereinafter be explained, the single reading of the scale has to be made on the ground from which the aeroplane rises when there is ample time to count the divisions from the north point with the assistance of the diameters drawn at intervals of 45°.

The glass $m$ of the box, which is movable in its fitting, carries a star $q$ and is provided with a knob $q^1$. The star $q$ is located at the same distance from the axis of the compass as the star $p$ of the rose.

In order to mark upon the compass the angle of the route that the aeroplane is to follow, the following procedure is adopted: The angle formed by the route to be followed with the north-south direction is determined on the map in the known manner. The aeroplane is directed in such a manner that the corresponding division of the rose $i$ presents itself beneath the sighting aperture $l^1$ in registration with the axis line of the compass. The star $q$ on the glass $m$ is then rotated until it screens the star $p$ of the rose $i$; similarly the sector $o$ is rotated until it screens the indicator $f$. The angle of the route is thus definitely indicated and after rising it is only necessary to again produce and maintain registration between the stars on the one hand and the sector and the indicator on the other hand for the aeroplane to follow the desired direction strictly.

It will be understood that by reason of the amplification of the variations of angle furnished by the indicator $f$, this device will be highly sensitive and very accurate while at the same time being very easy to read. Furthermore, the sensitiveness can be increased as much as desired by selecting much greater values such as 8, 16, and so forth for the ratio of the transmission of the compass. In order to increase the sensitiveness of the magnetic device the magnetized needles are constructed of very thin vertical plates.

The box of the compass is suspended by a gimbal in two rings $r$ and $s$ and supported by means of spiral springs $t$ and stretchers $u$. In acting upon the stretchers it is possible to regulate the compass for a given declination by displacing the axis line relatively to the axis of the apparatus.

Claims:

1. A compass comprising a casing, a magnetic needle, a rose integral with the magnetic needle, an indicator, and an amplifying device between the rose and the indicator.

2. A compass comprising a magnetic needle, a rose integral with the magnetic needle, an indicator, an amplifying device between the rose and the indicator, a casing in which the different parts of the compass are supported, a glass covering said casing, a pivotal support on said glass, and a screen pivoted on the same support.

3. A compass comprising a magnetic needle, a rose integral with the magnetic needle, an indicator, an amplifying device between the rose and the indicator, a casing in which the different parts of the compass are supported, a glass covering said casing, a pivotal support on said glass, a screen pivoted on the said support, a star marked at the north end of the north-south line of the rose, and a star marked on the glass at the same distance from the axis of the compass as the star of the rose, said glass being susceptible of rotating in its mounting.

In testimony whereof I have signed my name to this specification, in the presence of two subscribing witnesses.

GASTON EMILE COLOMBEL.

Witnesses:
JACQUES LEJEUNE,
LEON PEILLET.

Copies of this patent may be obtained for five cents each, by addressing the "Commissioner of Patents, Washington, D. C."